US007061921B1

United States Patent
Sheth (10) Patent No.: US 7,061,921 B1
(45) Date of Patent: Jun. 13, 2006

(54) METHODS AND APPARATUS FOR IMPLEMENTING BI-DIRECTIONAL SIGNAL INTERFACES USING LABEL SWITCH PATHS

(75) Inventor: Nischal Sheth, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 860 days.

(21) Appl. No.: 09/967,823

(22) Filed: Sep. 28, 2001

Related U.S. Application Data (60) Provisional application No. 60/277,035, filed on Mar. 19, 2001.

(51) Int. Cl.
*H04L 12/56* (2006.01)

(52) U.S. Cl. .................................. 370/395.52; 370/389

(58) Field of Classification Search ................ 370/351, 370/360, 389, 392, 400, 384, 373, 372, 395.1, 370/396, 397, 395.2, 395.21, 395.3, 395.31, 370/395.4, 395.52, 395.53, 395.54, 386, 370/391
See application file for complete search history.

(56) References Cited

U.S. PATENT DOCUMENTS

| | | | |
|---|---|---|---|
| 6,205,488 B1 * | 3/2001 | Casey et al. ................ 709/238 |
| 6,728,220 B1 * | 4/2004 | Behzadi ....................... 370/254 |
| 6,895,008 B1 * | 5/2005 | Enoki et al. ................. 370/392 |
| 2001/0019554 A1 * | 9/2001 | Nomura et al. .............. 370/389 |
| 2002/0054405 A1 * | 5/2002 | Guo et al. ................... 359/118 |
| 2003/0158965 A1 * | 8/2003 | Koester ....................... 709/239 |

* cited by examiner

*Primary Examiner*—Wellington Chin
*Assistant Examiner*—Brenda Pham
(74) *Attorney, Agent, or Firm*—Straub and Pokotylo; Michael P. Straub (57) ABSTRACT

Methods and apparatus for implementing bi-directional logical signal interfaces (LSIs) in communications systems which use uni-directional label switched paths (LSPs), e.g., MPLS networks, are described. To implement an LSI, two uni-directional LSPs between the same end points, e.g., routers, and extending in opposite directions, are associated together. The association of LSPs may be done by setting LSI configuration information in the routers at both ends of an LSI. Each router at the end of an LSI serves as an egress router for one of the LSPs associated with the LSI and an ingress router for the other LSP associated with the LSI. To enable an egress router to determine which, if any, LSI a packet or message corresponds to, a real as opposed to a null label is used when sending packets over an LSI LSP to an LSI LSP egress router.

14 Claims, 10 Drawing Sheets

Fig. 1

PRIOR ART

ROUTER R₁ CONFIGURATION INFORMATION
...
602
   LSI_1 {
       TRANSMIT-LSP   R1 TO R4
       RECEIVE-LSP    R4 TO R1
604   }
   LSI_2 {
       TRANSMIT-LSP   R1 TO R3
       RECEIVE-LSP    R3 TO R1
606   }
   LSI_3 {
       TRANSMIT-LSP   R1 TO R2
       RECEIVE-LSP    R2 TO R1
   }
...

ROUTER R₄ CONFIGURATION INFORMATION
...
702
   LSI_1 {
       TRANSMIT-LSP   R4 TO R1
       RECEIVE-LSP    R1 TO R4
704   }
   LSI_4 {
       TRANSMIT-LSP   R4 TO R2
       RECEIVE-LSP    R2 TO R4
706   }
   LSI_6 {
       TRANSMIT-LSP   R4 TO R3
       RECEIVE-LSP    R3 TO R4
   }
...

METHODS AND APPARATUS FOR IMPLEMENTING BI-DIRECTIONAL SIGNAL INTERFACES USING LABEL SWITCH PATHS

RELATED APPLICATIONS

This application claims the benefit of pending U.S. Provisional Patent Application Ser. No. 60/277,035 filed Mar. 19, 2001.

FIELD OF THE INVENTION

The present invention is directed to communications systems, and, more particularly, to methods and apparatus for implementing bi-directional communications using uni-directional label switched paths.

BACKGROUND OF THE INVENTION

Communications networks such as the Internet are used for transmitting information, e.g., digital data, from one device to another. Each communications network normally comprises a plurality of nodes. The nodes are implemented using, e.g., routers or switches, which are inter-connected by links over which data and control signals can pass. For ownership and administrative purposes, routers are frequently grouped together into individual networks referred to as autonomous systems (ASs). Individual networks, representing separate ASs, can be connected to each other to form a larger network. The Internet is an example of a large network made up of multiple interconnected ASs. Various protocols, e.g., Label Distribution Protocol (LDP) and Resource Reservation Protocol (RSVP), may be used with an AS, e.g., for establishing paths through the AS and for exchanging network information within the AS. Other protocols such as Border Gateway Protocol (BGP) and EBGP may be used for distributing network information between Ass, e.g., to be used in route calculations.

Figure 1:
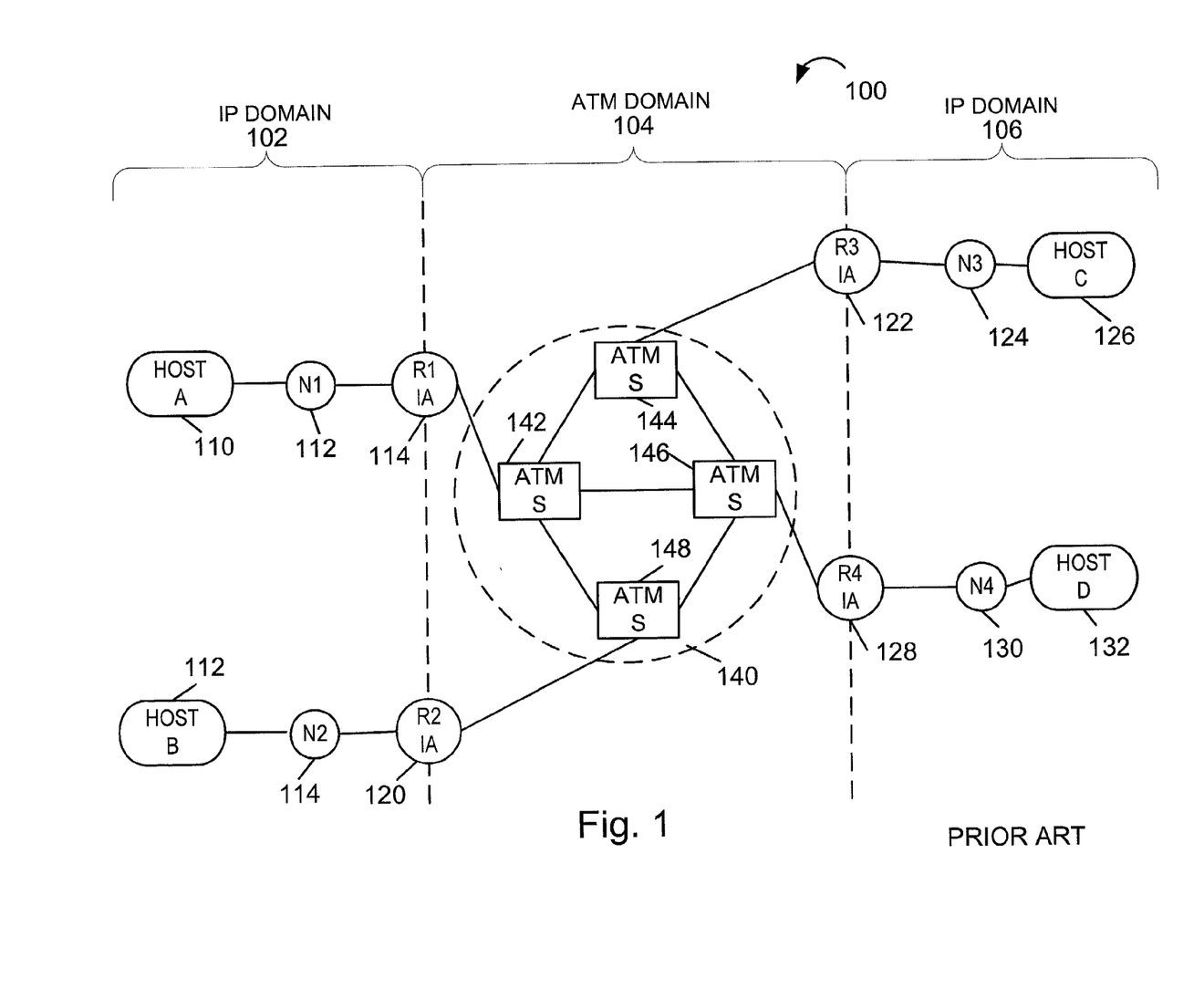
FIG. 1 illustrates an example of a known communications system that includes an ATM network at its core.

In order to provide high bandwidth between various networks and/or Internet nodes, many Internet Service providers (ISPs) turned to using high bandwidth Asynchronous Transfer Mode (ATM) networks to interconnect other, e.g., IP based, networks. Thus, overtime, ISPs became accustomed to using ATM networks for providing Internet backbone services. FIG. 1 illustrates an exemplary communications system 100 with an ATM core 240. In the illustrated system, various IP based networks N1 112, N2 104, N3 124, N4 130, N2 are used on the peripheral edges of the ATM core 140. The core 240 is implemented using ATM switches 142, 144, 146, 148. Routers 114, 120, 122, 128 at the edge of the ATM core connect the ATM core 140 to various IP based networks N1 112, N2 114, N3 124, and N4 130. The ATM edge routers 114, 120, 122, 128 support both IP and ATM routing as indicated by the letters IA in each of the circles used to represent the routers R1, R2, R3, R4. The IP networks 112, 114, 124, 130 are, in turn, coupled to host devices 110, 112, 126, 132, respectively, and may also be coupled to additional networks.

For purposes of discussion, the system 100 can be divided into different domains, e.g., first and second IP domains 102, 106 and ATM domain 104, based on the use of ATM cells or IP packets to transport data.

In the known system 100, each of the ATM routers 112, 114, 122, 128 communicates with every other router 112, 114, 122, 128 by a set of Permanent Virtual Circuits (PVCs) that are configured across the ATM physical topology. The PVCs function as logical circuits, providing bi-directional connectivity between edge routers 114, 120, 122, 128. The PVCs appear to the edge routers as simple point-to-point circuits between two routers. The physical routes corresponding to each ATM PVC are normally computed off-line with the routing information then being downloaded into the relevant ATM routers and switches to implement the desired mesh logical topology. IP address prefixes are then associated in the ATM edge routers with PVCs.

In order to transport a received packet across the ATM core 140, the routers 114, 120, 122, 128 encapsulate one or more IP packets into one or more ATM cells, associate the ATM cell with a PVC based on IP address prefix information included in the IP packet, and then transmit the ATM cell across the ATM domain 104. The edge router at the side of the PVC across from the point at which the packet entered the ATM domain, reassembles the ATM cells into one or more IP packets and forwards each IP packet based on the IP address included in the IP packet.

Unfortunately, ATM router interfaces have not kept pace with the latest increases in the bandwidth in optical cables used to carry Internet traffic. In addition, since ATM uses fixed size cells to carry IP packets, ATM results in wasted bandwidth sometimes referred to as an ATM cell tax. The complexities of maintaining an ATM network are another factor weighing against the use of ATM in today's competitive environment.

In recent years, Multiprotocol Label Switching (MPLS) has developed as an alternative to ATM. MPLS incorporates advanced label switching techniques with the use of variable length sized packets, e.g., MPLS packets, to avoid the disadvantages of fixed size cells used in ATM systems. MPLS systems use simplex, i.e., unidirectional, label switched paths (LSPs) between label switching routers (LSRs). Label switching routers (LSRs) are also known in the art as label swapping routers. An LSR is a router which supports packet forwarding based on, label switching, e.g., MPLS.

Unlike the case of ATM routers, MPLS routers have managed to keep pace with improvements in the bandwidth of optical links. Furthermore, MPLS's efficient use of bandwidth when transporting IP packets and various network management advantages MPLS offers over ATM has made MPLS increasingly popular when deploying new high speed networks to carry IP traffic between IP based networks.

Unfortunately, various common signaling protocols were designed for bi-directional communications paths. While such protocols are presently run over bi-directional ATM PVCs, the uni-directional nature of MPLS LSPs makes it difficult to run such protocols over an MPLS network.

Given the disadvantages of ATM as compared to MPLS, it is becoming increasingly desirable to replace ATM systems with MPLS systems. If MPLS routers could be modified to support bi-directional interfaces which could be used in a manner similar to ATM PVCs, it would greatly simply the task of replacing ATM routers and switches with MPLS routers and switches. This is because the same physical and logical network topology as an existing ATM network could be established with MPLS routers and switches being used as direct replacements for ATM routers and switches. In addition, many of the same protocols which were run over the ATM PVCs could be run over the MPLS routers if bi-directional interfaces could be supported in an MPLS system.

In view of the above discussion, it becomes apparent that there is a need for methods and apparatus for implementing bi-directional interfaces in an MPLS network.

SUMMARY OF THE INVENTION

The present invention is directed to methods for implementing bi-directional signal interfaces, e.g., logical signal interfaces (LSIs) between label switching devices such as MPLS routers and/or switches.

LSIs of the present invention are implemented by associating two uni-directional label switched paths (LSPs) together to serve as a bi-directional LSI. Once established, the routers at either end of an LSI can treat the LSI as a bi-directional signal path with each one of the pair of LSPs associated with the LSI supporting communications along the LSI in a different direction. Each LSI end router at each end of an LSI serves as an ingress router for one of a LSI's LSPs and an egress router for the other one of the LSI's LSPs.

In order for an egress router to determine the LSI associated with a packet or message which is forward to the egress router, a real, i.e., non-null, label is added by the penultimate router in each LSI LSP. The real label allows the router at the end of the LSI LSP to identify the LSI to which the packet or message belongs. If a response to a message transmitted on an LSI is received, the router which served as the LSI egress for the transmitted packet or message serves as the LSI ingress router for the reply. The LSI ingress router identifies the LSI to which the reply corresponds and forwards the reply message or packet along the LSI's LSP which extends in the direction opposite the LSP used to transmit the original packet or message.

Once configured with information relating to the pair of LSPs associated with each supported LSI, each LSI end router establishes the LSP or LSPs for which it serves as an ingress router. RSVP signaling may be used for this purpose.

When a router which supports one or more LSIs receives an LSP set up message, e.g., a Path message, the router determines from the message the ingress router for the LSP being established and then examines its stored LSI configuration information. By comparing LSP setup information, including ingress router information, to stored configuration information, each router determines if the LSP being established corresponds to an LSI LSP for which the particular router serves as an egress router.

When the router receiving a path setup message for an LSI LSP is the egress router for the LSP being established, it assigns a real, e.g., non-null label to be used by the penultimate router in the LSI LSP when forwarding packets along the LSI LSP. The real label may be supplied to the penultimate router as part of, e.g., a Resv message. As a result of assigning a real label to be used with the last hop of an LSI, the egress router in an LSI LSP will receive a real, as opposed to a null, label with packets and/or messages being forwarded along an LSI LSP. This allows the LSI associated with the packet or message to be identified by the egress router thereby making it possible to associate replies with the correct LSI.

Label stacking may be used with the LSI's of the present invention. This allows an LSI to appear as a bi-directional point to point connection to devices coupled to routers at the end of each LSI.

The LSIs of the present invention can be used in a manner that is the same as or similar to ATM PVCs. Thus, the LSIs of the present invention make it possible to replace existing ATM networks while maintaining the same overall network topology if desired. Unlike the case of ATM PVCs, the physical paths used for transmitting data in each direction of an LSI may be different depending on the physical path of the two LSPs which are used to implement an LSI.

Since LSIs of the present invention include a reverse communications path, by using LSIs a user can run multicast routing protocols over an MPLS core without the problem of reverse path forwarding checks failing as is the case when only uni-directional signal interfaces are used.

In addition to the above discussed uses, virtual private networks (VPNs) can be established in an MPLS network by using LSIs of the present invention to interconnect VPN nodes.

Various additional features and advantages of the present invention will be apparent from the detailed description that follows.

DETAILED DESCRIPTION

As discussed above, the present invention is directed to methods and apparatus for implementing bi-directional signal interfaces, e.g., logical signal interfaces (LSIs) in communications systems which use uni-directional label switched paths, (LSPs), e.g., MPLS networks.

In accordance with one feature of the present invention, two uni-directional LSPs, e.g., a transmit and a receive LSP, are bound together based on configuration information loaded into a network node, e.g., an MPLS router or switch. Each bound pair of uni-directional LSPs serves as a bi-directional LSI that can be used in a manner that is the same as, or similar to, the manner in which a PVC is used in an ATM network. Hereinafter, LSI will be used to refer to a pair of uni-directional LSPs which have been configured to serve as a bi-directional signal path.

Figure 2:
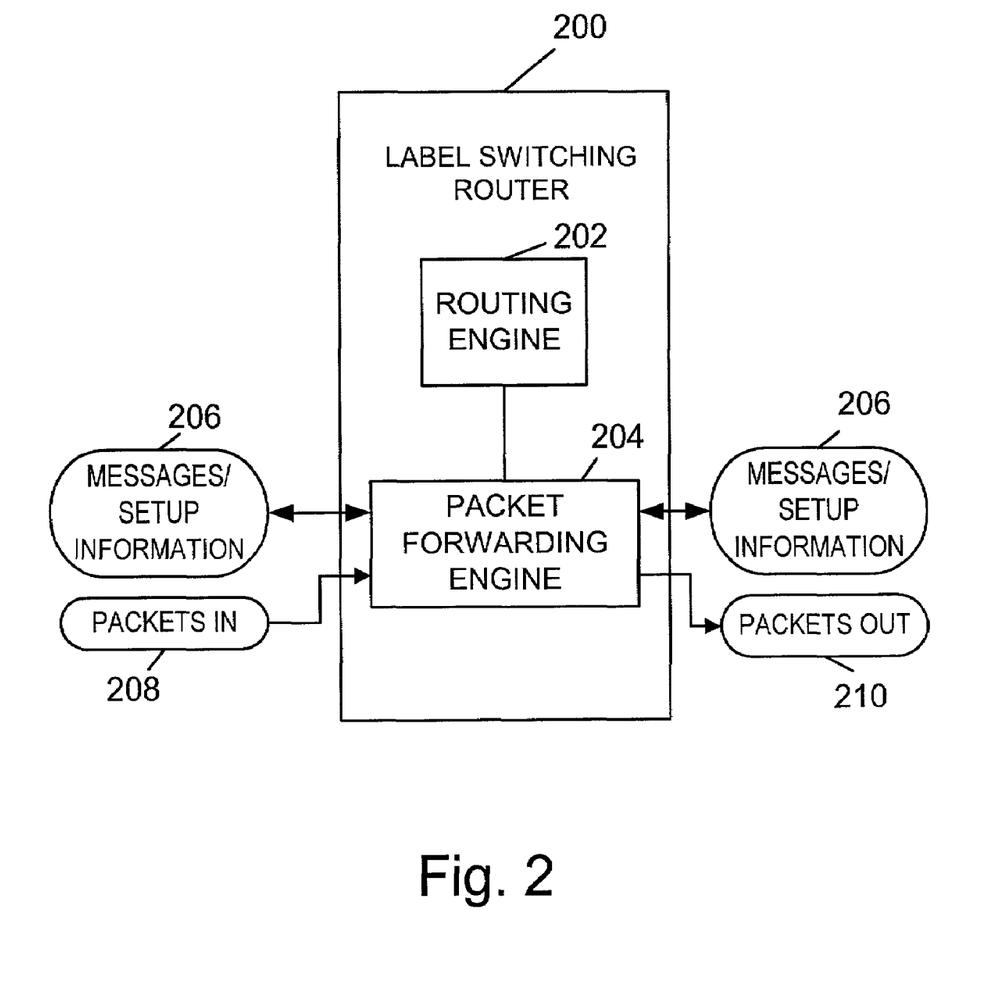
FIGS. 2 and 3 illustrate a label switching router that can be used in to establish bi-directional logical signal interfaces in accordance with the present invention.

FIG. 2 illustrates an exemplary label switching router (LSR) 200 which can be used to support LSIs in accordance wit the present invention. The LSR 200 may be, e.g., an MPLS LSR implemented in accordance with the present invention. The LSR 200 includes a routing engine 02 and a packet forwarding engine 204. The routing engine 202 is responsible for various path calculations and maintenance of one or more forwarding tables. As will be discussed below, the routing engine 202 of the present invention, unlike known routing engines, is capable of establishing LSIs and taking into consideration the existence of LSIs when doing routing operations.

The packet forwarding engine 204 is responsible for forwarding packets using the forwarding table(s) created by the routing engine 202. As part of the forwarding operation, the packet forwarding engine 204 receives packets 208 and outputs packets 210. The packet forwarding engine is also responsible for receiving and transmitting various route setup messages and signals 206. These messages may include RSVP path establishment messages, e.g., Path messages and Resv messages and/or LDP messages. The route setup messages and signals 206 are used by the routing engine 202 to establish routes through a network and to create forwarding table(s) used by the packet forwarding engine 204. Separating the packet forwarding operations from the route computation operations used to generate the forwarding tables allows the task of route computation to be performed independently, e.g., off-line, from the task of forwarding packets.

Figure 3:
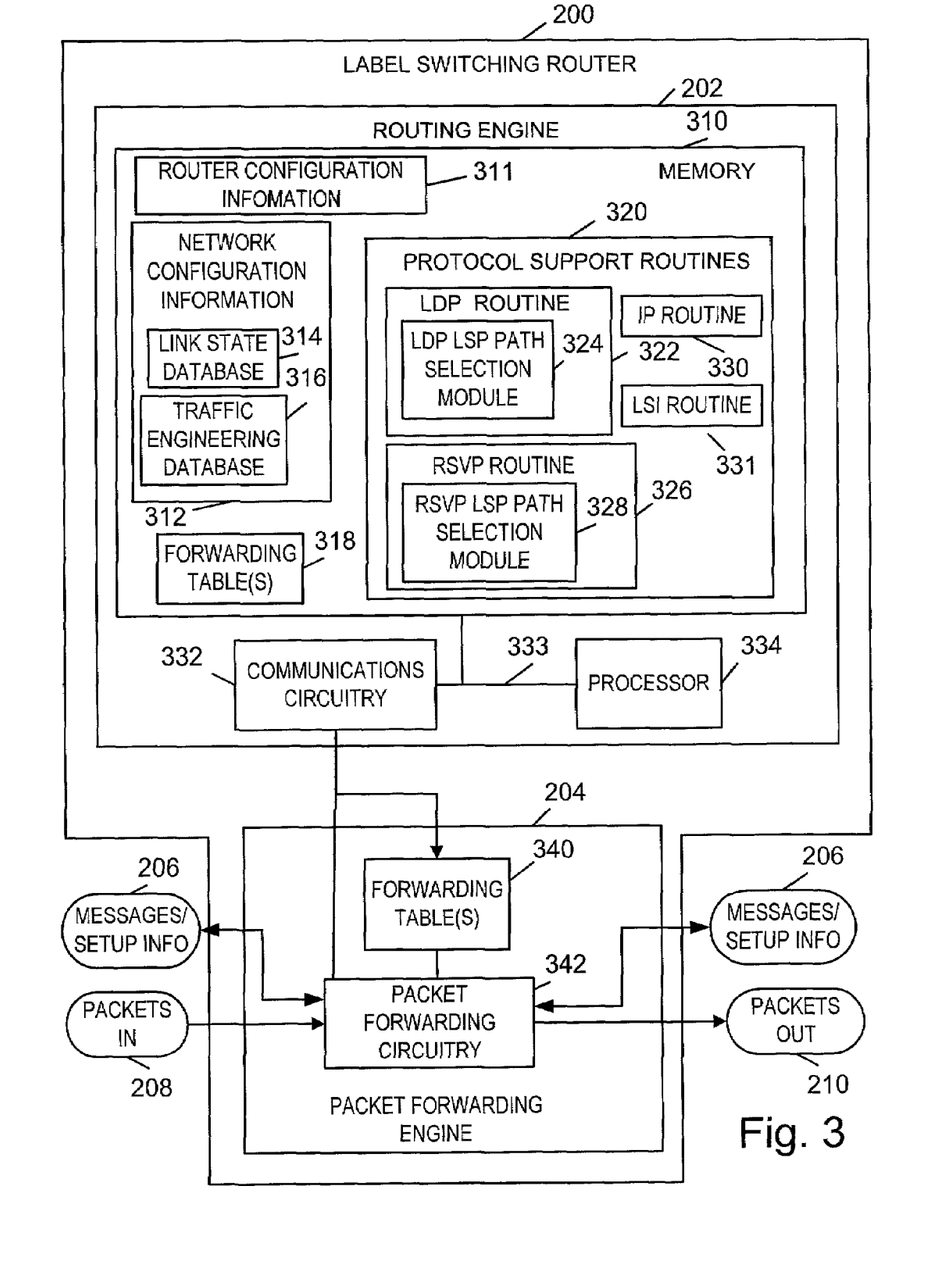

FIG. 3 illustrates the LSR 200 in greater detail. As illustrated in FIG. 3, the packet forwarding engine 204 includes packet forwarding circuitry 342 and one or more forwarding tables 340. Packet forwarding circuitry 342 is responsible for performing actual routing operations and for the receipt and transmission of network configuration and path setup messages which are relayed to and from the routing engine 202.

The routing engine 202 includes communications circuitry 332, memory 310 and a processor 334 which are coupled together by a bus 333. The communications circuitry 332 is coupled to the packet forwarding engine 304 and is used by the routing engine 310 to receive and send messages 306. The routing engine 202 can also use communications circuitry 332 to download all or portions of forwarding tables it generates to the packet forwarding engine 204.

Memory 310 is used to store network configuration information 312, router configuration information 311, protocol support routines 320, and forwarding table(s) 318.

The network configuration information 312 includes a link state database 314 and a traffic engineering database 316. The link state database 314 includes network topology information, e.g., preprogrammed information and/or information from OSPF/IS-IS messages and other sources. The link state database 314 includes network topology information of the type normally used for making Interior Gateway Protocol (IGP), e.g., shortest path fust (SPF), routing decisions. The traffic engineering database 316 includes network topology information of the type included in the link state database 314 but also includes additional information, e.g., information on the bandwidth of links, suitable for use in traffic engineered route determinations. In making traffic engineered route determinations the open shortest path may not be the path selected for routing purposes due to consideration of one or more constraints such as available bandwidth, etc.

Router configuration information 311 includes information associating LSPs with LSIs, on which protocols are to be supported by the LSR 200 at any given time, whether label stacking is to be enabled, whether traffic engineered shortcuts are to be enabled, and information on a wide variety of other features and/or services to be supported, e.g., provided, by the LSR 200 at any given time. The router configuration information 31, in accordance with the present invention, includes information on LSIs for which the router serves as an LSI end router point. In one particular embodiment the configuration information includes an LSI identifier, e.g., name for each supported LSI and also identifier information on the ingress and egress router for each LSP corresponding to a support LSI. Examples of LSI router configuration information will be discussed further below with regard to FIGS. 6 and 7. The protocol support routines 320 include an LDP routine 322, an RSVP routine 326, and an IP routine 330.

While the LSR 200 is capable of supporting multiple protocols, a system administrator can set control parameters in the router configuration information 311 to control which protocols are actually enabled, i.e., implemented, at any given time. IP, LDP and RSVP can all be enabled at the same time. Alternatively one or more of these protocols may be enabled. For example, in the case of an edge router that borders an IP and MPLS domain the IP protocol would be enabled as well as, e.g., RSVP or LDP. Additional protocols such as BGP may also be supported The LDP routine 322 is responsible for providing LDP functionality, including LDP messaging capabilities, to the LSR 300. The LDP routine 322 includes an LDP LSP selection module 324 which is responsible for determining LSP paths in accordance with information obtained using the LDP protocol. LSPs established using LDP are referred to herein as LDP LSPs.

The RSVP routine 326 is responsible for providing RSVP functionality including RSVP messaging capabilities. RSVP is commonly used to establish LSPs in traffic engineered applications.

RSVP routine 326 includes an RSVP LSP path selection module 328. The RSVP LSP path selection module 328 is responsible for determining LSPs which are to be established using RSVP. Such LSPs will be referred to herein as RSVP LSPs. RSVP path determinations may be based on a wide range of traffic engineering considerations including available router bandwidth along a considered path.

IP routine 330 is responsible for performing IP address based routing operations. Such operations include routing a packet based on the IP address included in the packet and assigning an IP packet to an LSP based on its IP address.

Included with the protocol support routines 320 is an LSI routine 331. LSI routine 331 can be called by the other routines 322, 326. For example, LSI routine 331 is responsible for accessing the router configuration information to determine when an LSP corresponds to an LSI and for assigning and managing the use of labels used on the last hop of an LSI.

The processor 334 is responsible for controlling operation of the routing engine 302 under direction of the routines 322, 326, 330 and 331. The routines 322, 326, 330, 331 may be implemented as software that includes one or more processor instructions. As discussed above, which routines 322, 326, 330, 331 are executed by the processor 334 at any given time is determined, at least in part, based on the router configuration information 311. Thus, when the router configuration information 311 indicates that RSVP is to be supported, the processor 334 will execute RSVP routine 326.

By executing one or more of the routines 322, 326, 330, 331 which perform routing functions, the processor 334 constructs one or more forwarding tables 318 to be used for packet forwarding based upon label or IP address information as well as router and network configuration information 311, 312. All or a portion of the generated forwarding tables 318 are loaded into the packet forwarding engine 304 by communications circuitry 332. In this manner, the forwarding tables 340 used by the packet forwarding engine are replaced and/or updated by the routing engine 202 as necessary.

The methods and apparatus of the present invention for establishing bi-directional LSIs can be used to facilitate the replacement of ATM components of existing networks, e.g., the ATM switches and routers of FIG. 1, with MPLS components, e.g., MPLS switches and/or routers to form a new system in accordance with the present invention.

Figure 4:
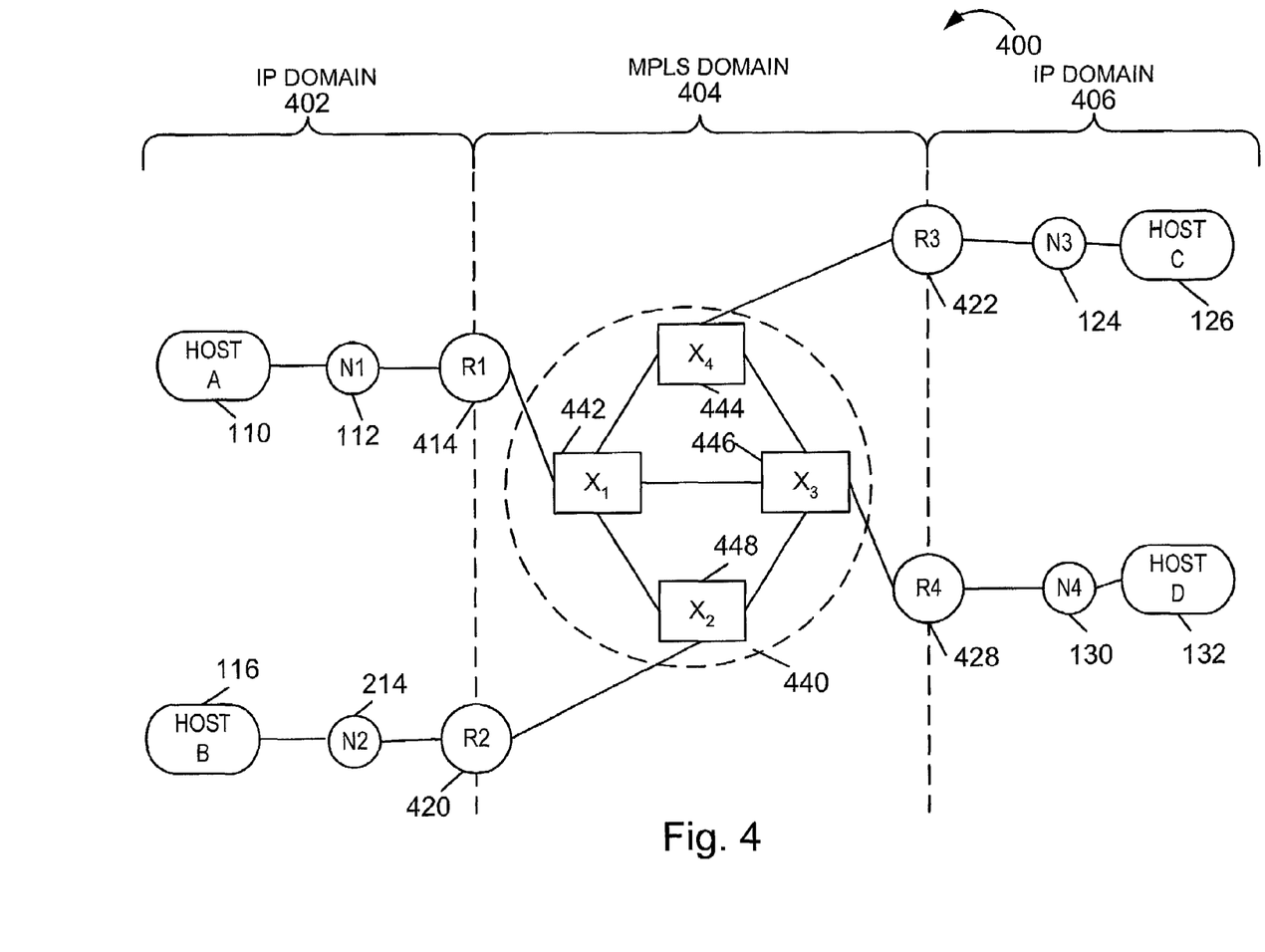
FIG. 4 illustrates an exemplary communications network 400 implemented in accordance with the present invention.

FIG. 4 illustrates an exemplary communications system 400 implemented in accordance with one embodiment of the present invention. An X is used in FIG. 4 to indicate that a MPLS device which can be either a router or switch. Elements in FIG. 4 which bear the same reference numbers as element of FIG. 1 can be implemented using the same or similar elements to those discussed above in regard to FIG. 1.

In the system 400, various IP based networks N1 112, N2 114, N3 124, N4 130, are coupled together by a network of MPLS devices including MPLS label swapping routers (LSRs) R1 414, R2 420, R3 422 and R4 428 and an MPLS core 440. The core 440 is implemented using MPLS routers or switches 442, 444, 446, 448. For purposes of explanation it will be assumed that the MPLS devices 442, 444, 446, 448 used to implement the core 440 are MPLS routers.

LSRs R1 414, R2 420, R3 422 and R4 428, at the edge of the MPLS core 440, couple the MPLS core 440 to the various IP networks 112, 114, 124, 130. The MPLS edge routers 414, 420, 422, 428 support both IP and MPLS routing. The IP networks 112, 114, 124, 130 are, in turn, coupled to host devices 110, 112, 126, 132, respectively, and may also be coupled to additional networks.

Note that the exemplary system 400 could be implemented by replacing the ATM switches 114, 120, 122, 128 with MPLS routers 414, 420, 422, 428, respectively and by replacing the ATM core 140 with the MPLS core 440 in accordance with the present invention.

For purposes of discussion, the system 400 is divided into different domains, e.g., first and second IP domains 402, 406 and MPLS domain 404, based on the use of MPLS packets or IP packets to transport data.

In the system 400, each of the MPLS routers 412, 414, 422, 428 communicates with every other router 412, 414, 422, 428 by a set of LSIs that are configured in accordance with the present invention. The LSIs function as logical circuits, providing bi-directional connectivity between edge routers 414, 420, 422, 428 in a similar way to the way PVCs are used to connect the elements of the ATM system shown in FIG. 1. The LSIs appear to the edge routers as simple point-to-point circuits between two routers.

Figure 5:
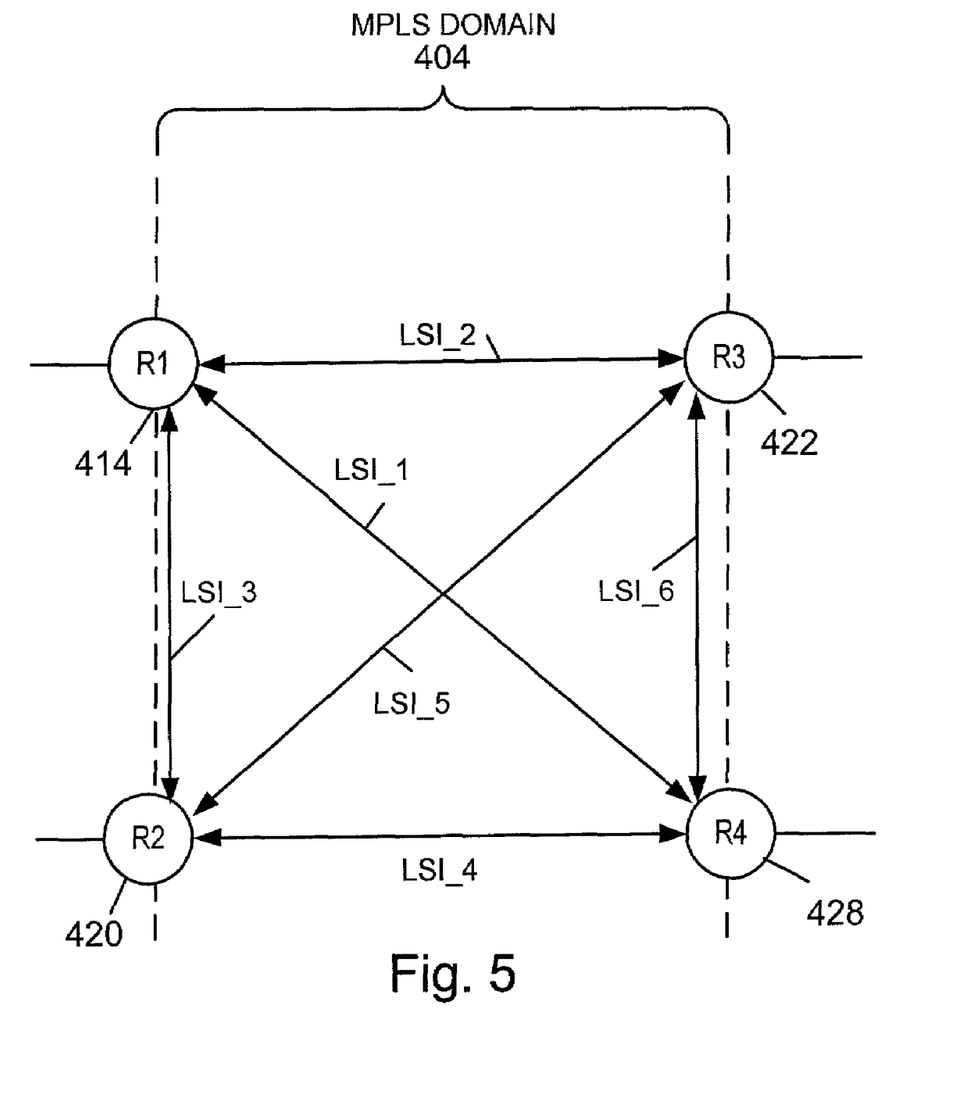
FIG. 5 illustrates various logical connections established in the system of FIG. 4 using LSIs in accordance with the present invention.

FIG. 5 is a logical view of the MPLS domain 404. Logically, an $N^2$ mesh is established with each router 414, 420, 422, 428 being logically connected to each of the other edge routers by an LSI. In particular, MPLS edge router R1 414 is logically connected to router R4 428 by LSI_1, to router R3 422 by LSI_2, and router R2 by LSI_3. MPLS router R2 420 is logically connected to router R1 414 by LSI_3, to router R3 422 by LSI_5, and router R4 by LSI_4. MPLS router R2 420 is logically connected to router R1 414 by LSI_3, to router R3 422 by LSI_5, and router R4 by LSI_4. MPLS router R3 422 is logically connected to router R1 414 by LSI_2, to router R2 420 by LSI_5, and router R4 by LSI_6. In addition, MPLS router R4 428 is logically connected to router R1 414 by LSI_1, to router R3 422 by LSI_6, and router R2 by LSI_4.

Each LSI is implemented as a pair of first and second LSPs and has a first router located at one end and a second router located at the other, e.g., opposing end of the LSI. The first router in an LSI serves as an ingress router for the first LSP and an egress router for the second LSP. Thus, from the perspective of the first LSI end router, the first LSP of an LSI appears as a transmit LSP while the second LSP appears as a receive LSP. The second LSI end router located at the other end of an LSI, across from the first LSI end router, serves as an egress router for the first LSP associated with the LSI and as an ingress router for the second LSP. Thus, from the perspective of the second router associated with an LSI, the first LSP appears as a receive LSP while the second LSP appears as a transmit LSP. In an embodiment where RSVP is used to establish LSPs, each router is responsible for establishing the LSPs, e.g., transmit LSPs, for which it serves as the ingress router.

The configuration information 311 stored in each individual router R1 414, R2 420, R3 422, R4 428 includes configuration information for each of the LSIs associated with the individual router in which the information 311 is stored.

Figure 6:
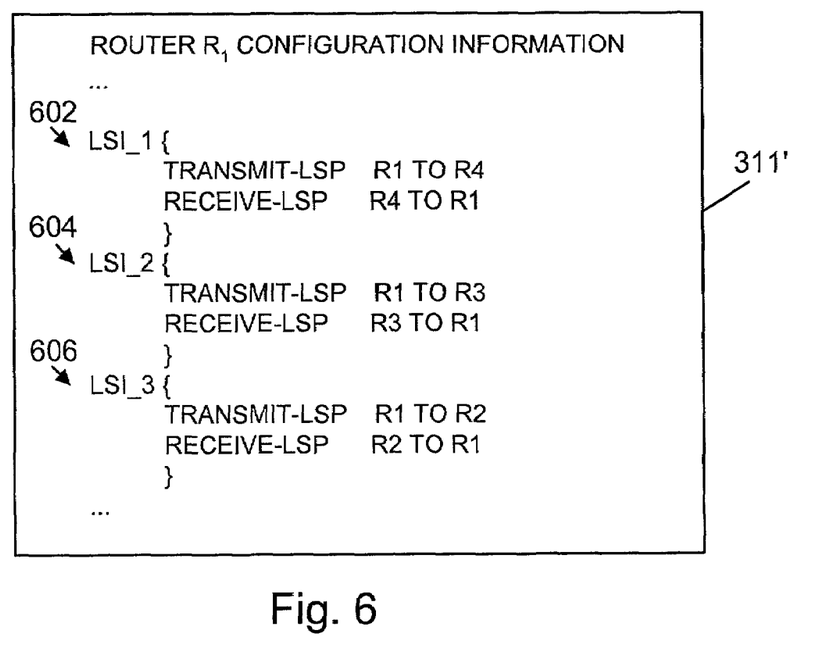
FIGS. 6 and 7 illustrate router configuration information for routers of the system shown in FIG. 4.

FIG. 6 illustrates a portion 311' of the router configuration information 311 stored in router R1 414. As illustrated, the configuration information 311' includes a list of each LSI, i.e., LSI_1, LSI_2 and LSI_3 that logically connects R1 to another router. Included in the LSI information list is information regarding the LSPs corresponding to each listed LSI.

In FIG. 6, it can be seen that the configuration information 602 for LSI_1 indicates that LSI_1 comprises a transmit LSP extending from R1 414 to R4 428 and a receive LSP extending from R3 422 to R1 414. The configuration information 604 for LSI_2 indicates that LSI_2 comprises a transmit LSP extending from R1 414 to R3 422 and a receive LSP extending from R4 428 to R1 414. Meanwhile, the configuration information 606 for LSI_3 indicates that LSI_3 comprises a transmit LSP extending from R1 414 to R2 420 and a receive LSP extending from R2 420 to R1 414.

In an embodiment where RSVP is used to establish LSPs, router R1 414 would determine from the configuration information 311', that it is responsible for establishing LSPs from R1 414 to R3 422, R4 428 and R2 420 to be used as part of LSIs LSI_2, LSI_1 and LSI_3, respectively. Router R1 414 would also establish the LSPs using RSVP signaling.

Figure 7:
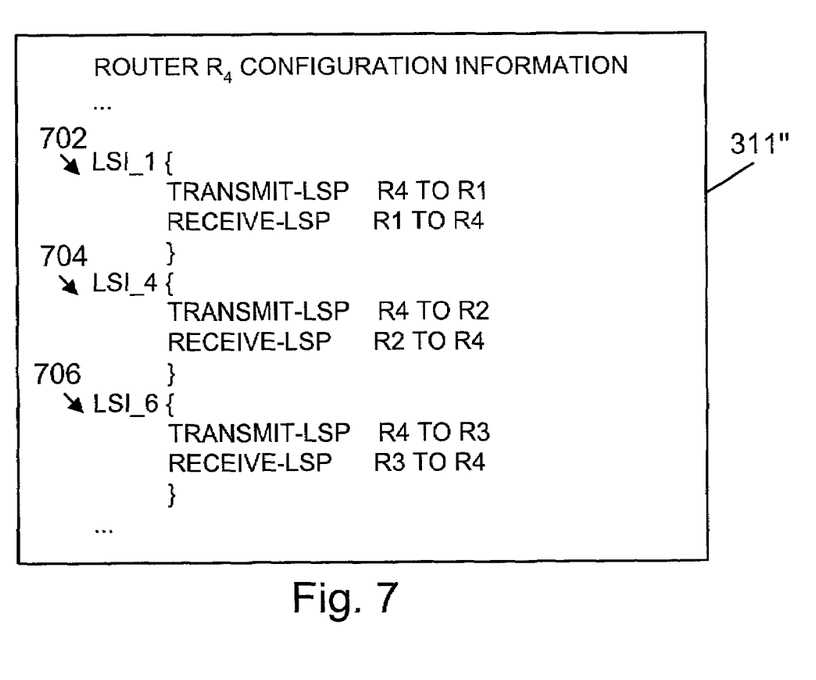

FIG. 7 provides another example of router configuration information. FIG. 7 illustrates a portion 311" of the router configuration information 311 stored in router R4 428. As illustrated, the configuration information 311" includes a list of each LSI, i.e., LSI_1, LSI_4 and LSI_6 that logically connects router R4 428 to another router.

In FIG. 7, it can be seen that the configuration information 702 for LSI_1 indicates that LSI_1 comprises a transmit LSP extending from R4 428 to R1 414 and a receive LSP extending from R1 414 to R4 428. In addition, the configuration information 704 for LSI_4 indicates that LSI_4 comprises a transmit LSP extending from R4 428 to R2 420 and a receive LSP extending from R2 420 to R4 428. Meanwhile, the configuration information 706 for LSI_6 indicates that LSI_6 comprises a transmit LSP extending from R4 428 to R3 422 and a receive LSP extending from R3 422 to R4 428.

The physical routes corresponding to each LSP of an LSI may be computed in any one of a plurality of ways in which LSPs are normally computed. In one exemplary embodiment where RSVP signaling is used for LSP establishment purposes, the head end, i.e., ingress router, of each LSP is responsible for computing the physical path to be used by the LSP through the network and then establishing the path through the use of RSVP signaling. The path computation is performed using the network topology information stored in the router's traffic engineering database 316.

For purposes of explaining the invention, the establishment and use of LSI_1 between routers R1 and R4 will now be discussed in detail. For purposes of this example, RSVP signaling will be used for establishment of the LSPs corresponding to LSI_1. Alternative LSP establishment techniques, e.g., LDP signaling, could be used as an alternative to RSVP.

LSI_1 is a logical bi-directional signal interface between routers R1 and R4. It comprises a first LSP extending from R1 414 to R4 428 and a second LSP extending from R4 428 to R1 414.

Based on the configuration information 602, router R1 414 is aware that it is to serve as the ingress router for an LSI_1 LSP extending from R1 414 to R4 428. Hereinafter, the LSI_1 LSP from R1 414 to R4 428 will be referred to as LSI_1 LSP_1. From configuration information 602, router R1 414 is also aware that it is to serve as the egress router for an LSI_1 LSP that extends from R4 428 to R1 414. This second LSI_1 LSP will hereinafter be referred to as LSI_1 LSP_2.

Similarly, based on the configuration information 202, router R4 428 is aware that it is to serve as the ingress router for LSI_1 LSP_2 and as the egress router for LSI_1 LSP_1.

Being the head end router for LSI_1 LSP_1, in response to being loaded with the LSI configuration information 602, router R1 414 calculates a physical path between routers R1 414 and router R4 428. In the FIG. 8 example, this path begins with router R1 414 and includes router X1 442, router X2 448, and router X3 446 before ending at router R4 428. The LSI_1 LSP_1 route is shown using arrows with long dashed lines and includes hops 802, 804, 806 and 808.

Figure 8:
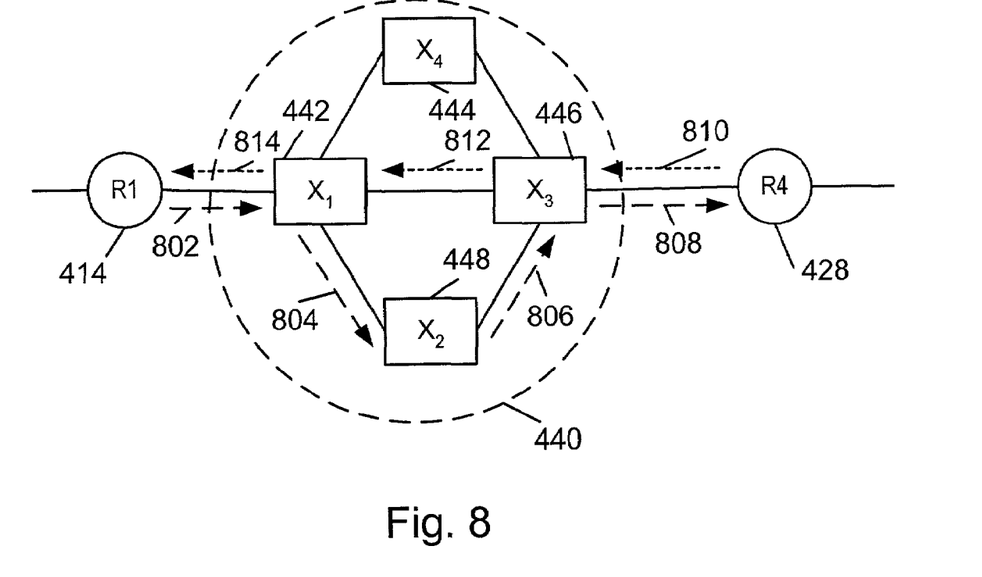
FIG. 8 illustrates hops corresponding to LSPs used to establish an LSI in accordance with the present invention.

R2 414 establishes LSI_1 LSP_1 by transmitting an Path message along the route of the LSP. The transmitted Path message includes path information, a request to assign labels, and a router identifier that identifies the ingress router R1 414.

Figure 9:
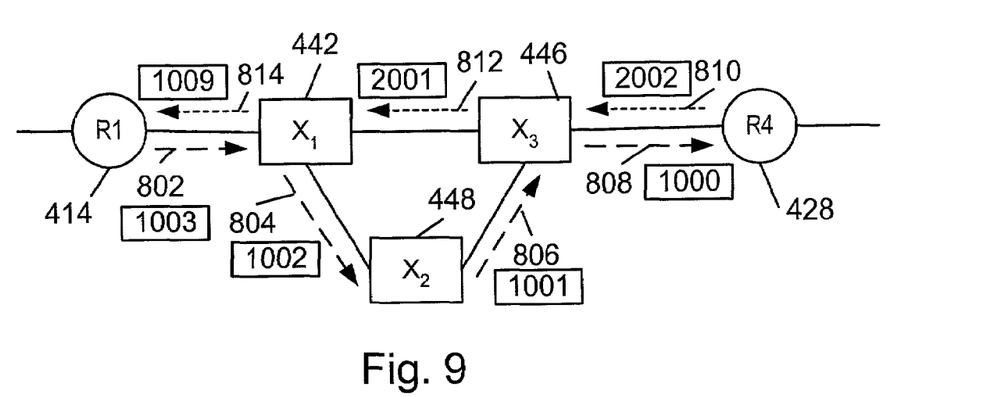
FIG. 9 illustrates labels assigned to be used by routers when transmitting packets and/or messages over an exemplary LSI.

In accordance with the present invention, upon receiving the RSVP LSI_1 LSP_1 Path message, egress router R4 checks its configuration information to determine if the path being established corresponds to an LSI listed in its configuration information 311. Upon making this check, router R4 428 determines that the received RSVP setup message corresponds to LSI_1 for which R4 serves as the egress router. Rather than respond to the message by signaling router X3 446 to use an explicit or implicit null label when sending packets to R4 428 along LSI_1 LSP_1, R4 indicates that a real label value, i.e., 1000 should be used. The real label may be selected by LSI routine 331 from a predefined range of values, e.g., 17–1024, selected for use with LSIs. Note that the use of label values in a specific range is a strictly local matter and does not have to be coordinated across the entire network 400. FIG. 9 shows the label 1000 assigned to be used with hop 808.

The use of a real label selected by the egress router to be used by the penultimate router in an LSI LSP allows the egress router, R4 428 to determine the specific LSI LSP to which a received packet corresponds. Using standard RSVP response messages, e.g., Resv messages, routers X3 446, X2 448 and X1 442 signal to the preceding router in LSI_1 LSP_1 that the path setup operation was successful and that the labels 1001, 1002, 1003, shown in FIG. 9, should be used by the routers when packets are transmitted over hops 806, 804, 802, respectively.

LSI_1 LSP_2, extending from R4 428 to R1 414, is established by router R4 428 using RSVP signaling in the same manner in which LSI_1 LSP_1 was established by router R1 414. In the FIG. 8 embodiment LSI_1 LSP_1 includes hops 810, 812, 814 with LSI_1 LSP_1 traversing routers $X_3$ 446 and $X_1$ 442 to reach R1 414. Labels 2002, 2001, 1010 are assigned to be used with hops 810, 812, 814, respectively. In accordance with the present invention, a real label 1010, as opposed to a null label which would normally be used for the last hop in an MPLS LSP, is assigned to hop 814 coupling router X1 442 to router R1 414. Thus, when router R1 414 receives a packet or message transmitted along LSI_1 LSP_2 it will be able to identify it as corresponding to LSI_1. This information can be used to identify the reverse communications path LSI_1 LSP_1 should it be necessary to send a reply message or other signal along the reverse communications path supported by LSI_1.

Figure 10:
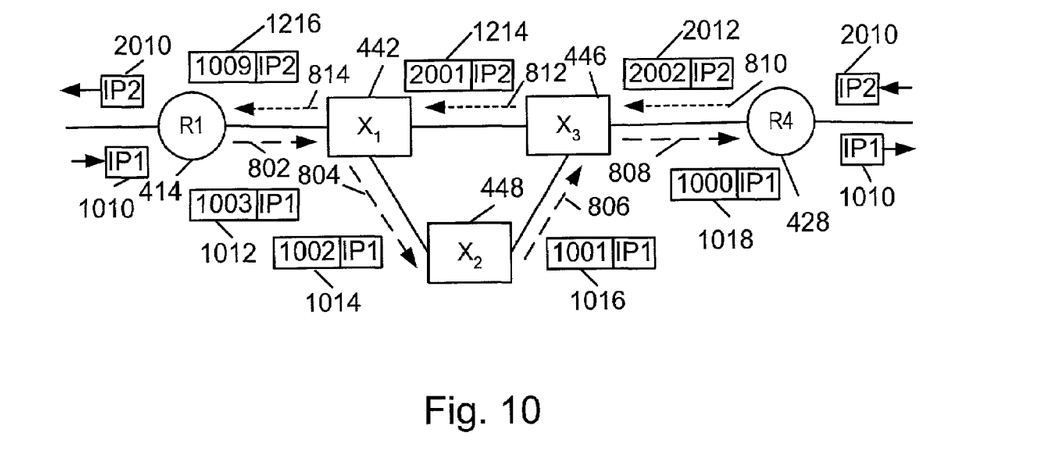
FIG. 10 illustrates transmitting packets over an LSI of the present invention using the labels shown in FIG. 9.

FIG. 10 illustrates the transmission of a first IP packet IP1 1010 from R1 414 to R4 428 using LSI_1 and, in particular LSI_1 LSP1. Also illustrated in FIG. 10 is the transmission of a second IP packet IP2 2010 from R4 428 to R1 2010 using LSI_1 and, in particular LSI_1 LSP_2.

When IP packet IP1 1010 is received by MPLS router R1 414 it is assigned to LSI_1 LSP_1 based on the IP address information included in the packet IP1 1010. LSR R1 414 encapsulates IP1 1010 in an MPLS packet along with label 1003 thereby forming packet 1012. Packet 1012 is transmitted to router $X_1$ via hop 802. Router $X_1$ replaces label 1003 with label 1002 and forwards the resulting packet 1014 to router $X_2$ 448. Router $X_2$ 448 in turn replaces label 1002 with label 1001 and forwards the resulting packet 1016 to router $X_3$ 446.

Router X3 446 is the penultimate router for LSI LSP_1. During normal MPLS operation, the penultimate router in an LSP forwards the packet to the LSP egress router without a label which is interpreted as an implicit NULL, or with an explicit NULL label having the value of 0. In accordance with the present invention penultimate router X3 446 replaces the label 1001 with a real label, i.e., a non-null label, having the value 1000 to form packet 1018. Packet 1018 is forwarded to router R4 which, determines from label 1000 that the packet corresponds to LSI_1 router R4 428 removes the MPLS encapsulation thereby striping the label 1000 from packet 1018 to produce IP packet 1010. LSR R4 428, based on the IP address included therein, then forwards IP packet 1010, e.g., to IP networks N4 130.

Communication along LSI_1 LSP_2 occurs in the same manner as that described with regard to LSI_1 LSP_1 but occurs in the direction of R4 428 to R1 414 and proceeds along the physical path corresponding to LSI_1 LSP_2. In the FIG. 10 example, IP2 2010 is assigned to LSI_1 LSP_2 based on the IP address included in the packet 2010. LSR R4 428 encapsulates IP2 in an MPLS packet adding label 2002 to created MPLS packet 2012. MPLS packet 2012 is forwarded to X3 446 which replaces the label 2002 with the label 2001 to create packet 1214. Packet 1214 is forwarded to LSR X1 442. LSR X1 442 is the penultimate router in LSI_1 LSP_1. In accordance with the present invention is replaces the label 2001 with the label 1009 to form packet 1216. MPLS packet 1216 is forwarded to LSR R1 414. LSR R1 414 removes the MPLS encapsulation to produce IP packet IP2 2010 which it then forwards based on the IP address information included therein.

Messages and/or signals may be transmitted from R1 to R4 using the same encapsulation and label forwarding techniques explained with regard to exemplary IP packets IP1 1010 and 2010. The routers R4 and R1 when operating as an egress router, forward the message or signal according to the specific protocol or addressing scheme used to transmit the message or signal. Replies to messages and/or signals transmitted along LSI_1 are identified and associated with LSI_1 by the egress router which routed the message. The egress router, now serving as the ingress router for the reverse communications path uses the stored configuration information 311 to identify the LSI to which the reply message corresponds. The router receiving the reply message then transmits the replay message along the transmit path identified in its configuration information of the LSI identified as being associated with the reply message.

Based on the real label received by an LSR serving as an LSI LSP egress router, the LSR is able to determine the LSI to which a message corresponds and to then associate replies to the message to the same LSI.

Router R4 428 serves as the egress router for LSI_1 LSP_1. In accordance with the present invention, router R4 428 will assign a reply received by router R4 428, to a message originally transmitted on LSI_1 LSP_1, to LSI_1 LSP_2. The assigned reply message is then encapsulated in an MPLS packet and transmitted to R1 414 via LSI_1 LSP_2.

Router R1 414 serves as the egress router for LSI_1 LSP_2. Thus, in accordance with the present invention, router R1 414 will assign a reply received by router R1 428 to a message transmitted on LSI_1 LSP_2 to LSI_1 LSP_1. The assigned reply message is then encapsulated by router R1 414 in an MPLS packet and transmitted to R4 428 via LSI_1 LSP_1.

Various multicast protocols use reverse path forwarding (RPF) checks. RPF checks require the existence of a reverse communications path corresponding to the path used to transmit a multicast setup message or the check will fail. Conventional MPLS uses uni-directional LSPs which cases conventional multicast routing protocols which use RPF checks to fail when an MPLS network is encountered.

The bi-directional nature of the LSI's of the present invention make it possible to run standard multicast routing protocols in an MPLS network. In one such embodiment, multicast routing protocols are run over the MPLS routers 414, 420, 422, 422 and MPLS core 440 shown in FIG. 10, using the LSIs shown in FIG. 5. In such an embodiment, the RPF checks made by routers 414, 420, 422, 428 will succeed since the LSIs appear to the multicast routing protocol as bi-directional signal interfaces despite being implemented using two uni-directional LSPs.

As discussed above, an LSI can be treated as a simple point to point connection representing, e.g., a single hop in a path that includes the LSI. In accordance with the present invention, label stacking can, and in various embodiments is, enabled for LSPs of an LSI. In such an embodiment, each LSP in an LSI is assigned a label to be used by routers sending packets or messages over the LSI. For LSP path calculations by routers outside the LSI path, the label is interpreted as corresponding to a single hop between the LSI end routers, e.g., routers R1 414 and R4 428.

While different labels can be assigned to each LSP in an LSI's pair of LSPs the same label can be used for both LSP_1 and LSP_2 if desired since the label need only be unique locally, e.g., at the LSP egress router, which will perform routing based on the label.

Figure 11:
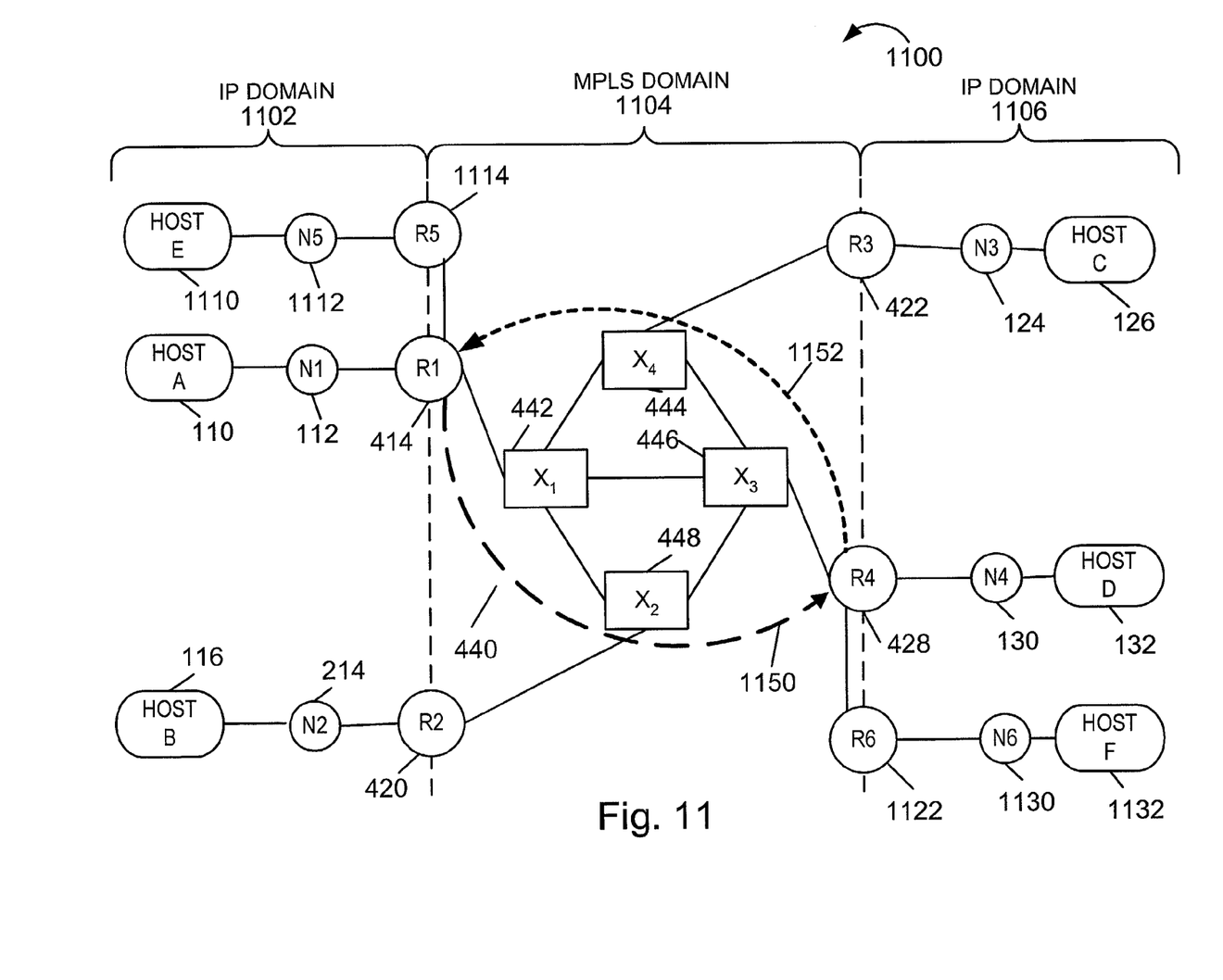
FIG. 11 illustrates another exemplary communications network which includes an LSI in accordance with the present invention.

FIG. 11 illustrates another exemplary computer network 1100 implemented in accordance with the present invention. The network 1100 includes MPLS LSRs R5 1115, R6 1116, host devices E and F 1110, 1132, and IP networks N5 1112 and N6 1130. These elements are in addition to the elements previously discussed in regard to network 400.

In FIG. 11, IP network N5 1112 couples host E 1110 to LSR R5 1114. LSR R5 1114, in turn is coupled to LSR R1 414. In a similar manner, IP network N6 1130 couples host F 1132 to LSR R6 1122. LSR R6 in turn is is coupled to LSR R4 428.

As in the FIG. 10 example, an LSI, LSI_1 is established between R1 1152 and R4 428 using as two LSPs, LSP_1 and LSP_2. From the perspective of routers R5 and R6, LSI_1 LSP_1 and LSI_1 LSP_2 appear as single hops 1150 and 1152, respectively, which may be used for LDP and/or RSVP path determination purposes. In accordance with the present invention, for external routing purposes a single label, e.g., 3001, is assigned to the hop 1150, 1152, respectively, corresponding to LSP_1 and LSP_2. Label 3001, along with the labels used for routing within the core 440, will be stacked for purposes of transmitting messages and/or IP packets between R1 and R6 using LSI_1. In the present example, the label 3001 is assigned for both LSI_1 LSP_1 and LSI_1 LSP_2 but two different labels could be used, one for each LSP.

Figure 12:
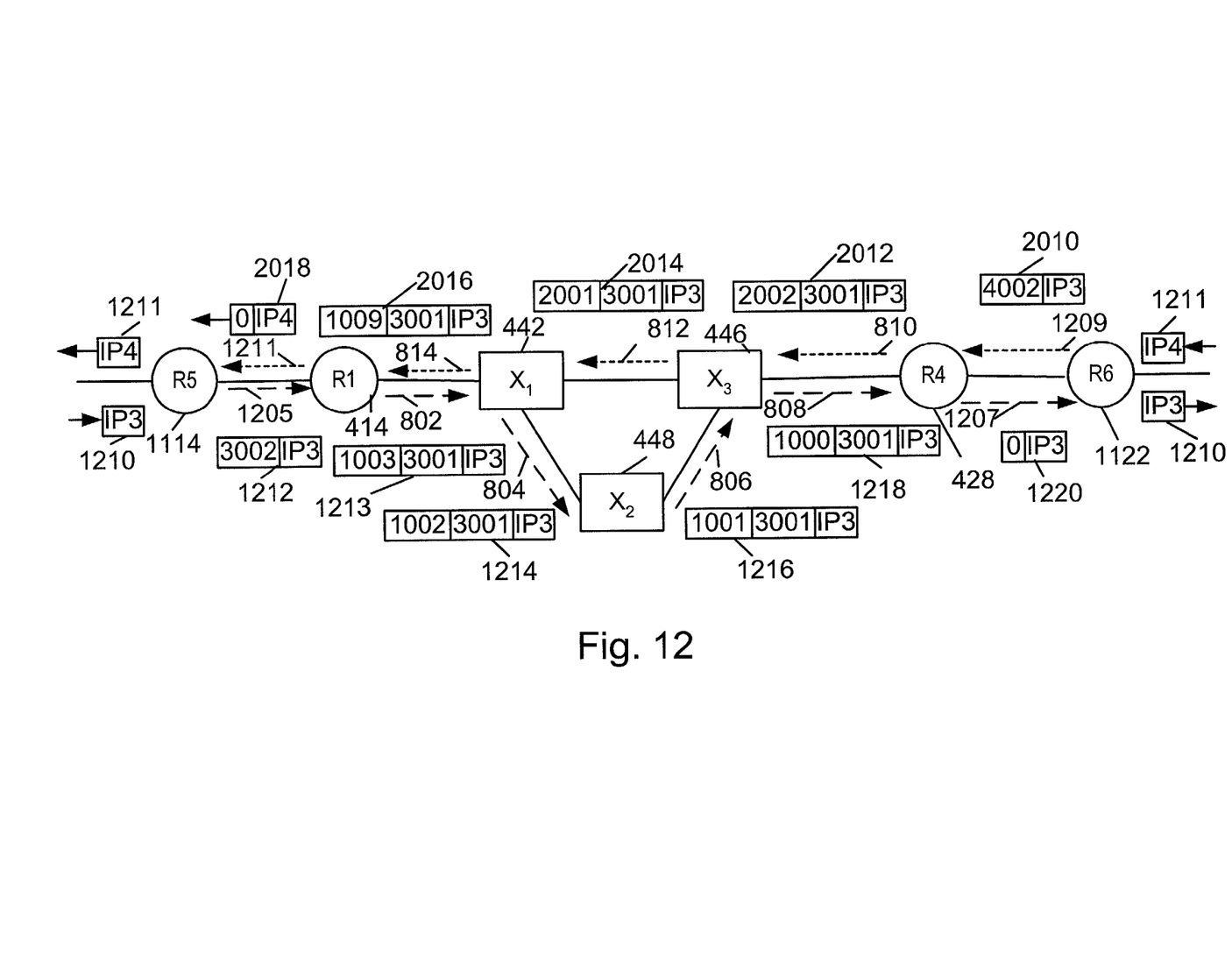
FIG. 12 illustrates the use of label stacking in communication packets over the LSI illustrated in FIG. 11.

FIG. 12 illustrates an example wherein a first LSP from R5 to R6 (LSP_56) and a second LSP from R6 to R5 (LSP_65) is established using LSI_1. LSP_56 and LSP_65 may be established using RSVP or LDP signaling across LSI_1.

During establishment of LSP_56, in the illustrated example, the label 3002 is assigned to be used for hop 1205 from LSR R5 to LSR R1, the label 3001 is assigned to be used for the hop 1150 across LSI_1 from LSR R1 to LSR R4, and an explicit null label having a value of 0 is assigned to be used for the last hop 1207 between LSR R4 and LSR R6.

During establishment of LSP_65, the label 4002 is assigned to be used for the hop 1209 from LSR R6 to LSR R4, the label 3001 is assigned to be used for the hop 1152 across LSI_1 from LSR R4 to LSR R1, and an explicit null label having a value of 0 is assigned to be used for the last hop 1211 between LSR R4 and LSR R6.

The transmission of an IP packet IP3 1210 from R5 to R6 using LSP_56 is shown in FIG. 12. Router R5 1114 receives IP3 1210 and assigns it to LSP_56 based on the IP address included therein. It then encapsulates the packet in an MPLS packet which includes the label 3002 to form packet 1212. Packet 1212 is forwarded to LSR R1 414 which assigns the packet, based on the received label, to LSI_1 LSP_1. LSR R1 uses label stacking to create packet 1213. In particular, LSR R1 414 replaces the label 3002 with the label 3001 corresponding to hop 1150 of LSP_56 and also adds label 1003 assigned to be used for hop 802 when traversing the core 440. LSR X1 442 replaces the outer label 1003 with the label 1002 to create packet 1214 which is forwarded to router X$_2$ 448. Router X$_2$ 448 swaps the outer label 1002 with the label 1001 to form packet 1216 which is forwarded to router X$_3$ 446. Router X3, the penultimate router in LSI_1 LSP_1, performs a label swapping operation replacing the outer label 1001 with the label 1000 to form packet 1218. LSR R4, the egress router for LSI_1 LSP_1 determines from the outer label, that the received packet 1218 corresponds to LSI_1 and temporarily stores that information in memory in the event that a reply is received in response to the packet 1218. LSR R4 428 pops the outer label 1000 and replaces label 3001 with the Null label value of 0 to form MPLS packet 1220. Packet 1220 is forwarded to router R6 which removes the MPLS encapsulation and routes packet 1210 based on the IP address information included therein.

Routing of an IP packet IP4 1211 along LSP_65 occurs in a similar manner to the routing of an IP packet described with regard to LSP_56. Router R6 1122 receives IP4 1211 and assigns it to LSP_65 based on the IP address included in the packet therein. Router R6 then encapsulates the packet with the label 4002 thereby forming MPLS packet 2010. Packet 2010 is forwarded to router R4 428 which assigns the packet, based on the received label, to LSI LSP_2. Router R4 uses label stacking to create packet 2012. In particular, LSR R4 414 replaces the label 4002 with the label 3001 corresponding to hop 1150 of LSP_56 and also adds label 2002 assigned to be used for hop 810 when traversing the core 440. LSR $X_3$ 446 receives packet 2012 and replaces the outer label 2002 with the label 2001 to create packet 2014 which is forwarded to router $X_1$ 442. Router $X_1$ 442, the penultimate router in LSI_1 LSP_2 performs a label swapping operation replacing the outer label 2001 with the label 1009 to form packet 2016. LSR R1 414, the egress router for LSI_1 LSP_2 receives packet 2016 and determines from the outer label, that the received packet 2016 corresponds to LSI_1. LSR R1 414 temporarily stores the packet/LSI relationship information in memory in the event that a reply is received in response to packet 2016. LSR R1 414 pops the outer label 1009 and replaces label 3001 with the Null label value of 0 to form MPLS packet 2018. Packet 2018 is forwarded to router R5 1114 which removes the MPLS encapsulation and routes packet 1211 based on the IP address information included therein.

In accordance with one embodiment of the present invention, backup LSPs are designated to replace the primary LSPs used to implement an LSI in the event of a system, e.g., router failure. By running BGP over logical signal interfaces implemented with backup LSPs, the reconvergence time for BGP routes when an LSP goes down can be minimized. This is because when an LSP of an LSI fails, the backup LSP can be used to replace the failed LSP without requiring changes to the BGP routes. This is because, in such an embodiment, BGP routes are based on LSIs and not the underlying LSPs which are used to implement the LSIs.

In addition to enhancing BGP performance, the LSIs of the present invention can be used to implement virtual private networks (VPNs). VPNs can be established in accordance with the present invention by creating an LSI associated with a VPN between each node of the VPN being implemented. A separate LSI is created in such an embodiment for each VPN supported by a router.

Additional uses of the LSIs of the present invention will be apparent to those skilled in the art based on description and figures of the present application. Such uses are intended to be within the scope of the present application and claims.

What is claimed is:

1. A communications system, comprising:
   a first label switching router configured to operate as an ingress router for a first label switched path and as an egress router for a second label switched path, the first label switching router including information associating the first and second label switched paths to implement a logical signal interface;
   a second label switching router configured to operate as an ingress router for the second label switched path and as an egress router for the first label switched path, the second label switching router including information associating the first and second label switched paths, the second router further being configured to operate as a penultimate router for a third unidirectional label switched path which is not part of a bi-directional logical switched interface between the end points of said third unidirectional label switched path, said second router being configured to use a null label when forwarding packets corresponding to the third unidirectional label switched path; and
   a third label switching router, the third label switching router being configured to operate as a penultimate router in said first label switched path, said third label switched router being configured to include a non-null label with packets corresponding to said first label switched path when said packets are forwarded along said first label switched path to the second label switched router which operates as the egress router for said first label switched path.

2. The communications system of claim 1, wherein said third label switching router includes information indicating the value to be used for said non-null label to be included in packets transmitted to the second label switched router along said first label switched path.

3. The communications system of claim 1, further comprising:
   a fourth label switching router, the fourth label switching router being configured to operate as a penultimate router in said second label switched path and including:
   means for including a non-null label in packets transmitted to the first label switched router along said second label switched path.

4. The communication system of claim 3, wherein the first, second and third label switching routers are MPLS routers.

5. The communications system of claim 3, wherein the third label switching routers is included in said first label switched path but not in said second label switched path.

6. The communications system of claim 1, wherein said first label switching router is configured to perform a label stacking operation when forwarding packets along said first label switching path, said label stacking operation including adding a first label corresponding to the first label switching path and a second label corresponding to the third label switching path, said first label being an outer label and the second label being an inner label.

7. The communications system of claim 1, wherein said second label switching router is configured to perform a label popping operation when forwarding packets along said first label switching path, said label popping operation including removing labels corresponding to the first and third switching paths prior to forwarding along the third label switching path with a null label.

8. A communications method, comprising:
   configuring a first label switching router to operate as an ingress router for a first label switched path and as an egress router for a second label switched path, the first label switching router including information associating the first and second label switched paths to implement a logical signal interface;
   configuring a second label switching router to operate as an ingress router for the second label switched path and as an egress router for the first label switched path, configuring the second label switching router including storing in the second label switching router information associating the first and second label switched paths; and
   further configuring the second router to operate as a penultimate router for a third unidirectional label switched path which is not part of a bi-directional logical switched interface between the end points of said third unidirectional label switched path, said configuring including configuring the second router to use a null label when forwarding packets corresponding to the third unidirectional label switched paths;
   configuring a third label switching router to operate as a penultimate router in said first label switched path, configuring said third label switched router including setting the third label switched router to include a non-null label with packets corresponding to said first label switched path that are forwarded along said first label switched path to the second label switched router which operates as the egress router for said first label switched path.

9. The communications method of claim 8, wherein configuring said third label switching router includes storing in the third label switched router information indicating the value to be used for said non-null label to be included in packets transmitted to the second label switched router along said first label switched path.

10. The communications method of claim 8 further comprising:
configuring a fourth label switching router to operate as a penultimate router in said second label switched path, configuring said forth label switching router including setting the fourth label switching router to include a non-null label in packets transmitted to the first label switched router along said second label switched path.

11. The communications method of claim 10, wherein the first, second and third label switching routers are MPLS routers.

12. The communications method of claim 8, wherein the third label switching router is included in said first label switched path best not in said second label switched path.

13. The communications method of claim 8, wherein configuring said first label switching router includes setting the router to perform a label stacking operation when forwarding packets along said first label switching path, said label stacking operation including adding a first label corresponding to the first label switching path and a second label corresponding to the third label switching path, said first label being an outer label and the second label being an inner label.

14. The communications method of claim 8, wherein configuring said second label switching router includes setting the second label switching router to perform a label pooping operation when forwarding packets along said first label switching path, said label popping operation including removing labels corresponding to the first and third switching paths prior to forwarding along the third label switching path with a null label.

* * * * *